(12) United States Patent
Wolf

(10) Patent No.: US 8,963,673 B2
(45) Date of Patent: Feb. 24, 2015

(54) HAND TOOL DEVICE HAVING AT LEAST ONE CHARGING COIL

(71) Applicant: Matthias Wolf, Stuttgart (DE)

(72) Inventor: Matthias Wolf, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 13/623,270

(22) Filed: Sep. 20, 2012

(65) Prior Publication Data
US 2013/0069756 A1 Mar. 21, 2013

(30) Foreign Application Priority Data
Sep. 20, 2011 (DE) .......................... 10 2011 083 003

(51) Int. Cl.
H01F 27/30 (2006.01)
H01F 5/00 (2006.01)
H01F 27/24 (2006.01)
H01F 17/04 (2006.01)

(52) U.S. Cl.
CPC ...................................... H01F 17/04 (2013.01)
USPC ........... 336/198; 336/200; 336/207; 336/208; 336/212

(58) Field of Classification Search
USPC ......... 336/198, 199, 200, 207, 208, 130, 212, 336/131, 132
See application file for complete search history.

(56) References Cited

U.S. PATENT DOCUMENTS

| 2,878,425 | A | * | 3/1959 | Kudoh | 315/284 |
|---|---|---|---|---|---|
| 4,138,783 | A | * | 2/1979 | Portier | 29/606 |
| 4,763,072 | A | * | 8/1988 | Katoh et al. | 324/253 |
| 5,233,324 | A | * | 8/1993 | Beihoff et al. | 336/83 |
| 5,575,437 | A | * | 11/1996 | Campbell | 242/608.6 |
| 7,605,681 | B2 | * | 10/2009 | Wobben | 336/130 |
| 2002/0075115 | A1 | * | 6/2002 | Yeh et al. | 336/198 |
| 2004/0252001 | A1 | * | 12/2004 | Yamada et al. | 336/198 |
| 2009/0117452 | A1 | * | 5/2009 | Wiesner et al. | 429/90 |
| 2009/0128273 | A1 | * | 5/2009 | Huss et al. | 336/61 |
| 2012/0161916 | A1 | * | 6/2012 | Eng et al. | 336/212 |

* cited by examiner

Primary Examiner — Elvin G Enad
Assistant Examiner — Kazi Hossain
(74) Attorney, Agent, or Firm — Kenyon & Kenyon LLP

(57) ABSTRACT

In a hand tool device having at least one charging coil provided for transmitting energy, the charging coil includes a coil core having at least two core segments which are movable relative to each other.

39 Claims, 2 Drawing Sheets

HAND TOOL DEVICE HAVING AT LEAST ONE CHARGING COIL

BACKGROUND OF THE INVENTION

1. Field of the Invention

The present invention relates to a hand tool device having at least one charging coil.

2. Description of the Related Art

A hand tool device having at least one charging coil, which includes a coil core and which is provided for transmitting energy, has already been proposed.

BRIEF SUMMARY OF THE INVENTION

In the present invention, which is directed to a hand tool device having at least one charging coil which includes a coil core and which is provided for transmitting energy, it is proposed that the coil core has at least two core segments which are movable relative to each other. The core segments are preferably movable relative to each other nondestructively upon deformation of a housing. In particular, a "charging coil" is understood to be a coil which transmits and/or preferably receives energy for charging and/or discharging, in particular, a hand tool battery, in at least one operating state. A system having a hand tool battery and a charging device and/or a hand tool includes two coordinated charging coils which may be spatially separated from each other by a user. A "coil core" is understood to be, in particular, an element which is provided for conducting a magnetic field of a coil loop of the charging coil to another charging coil. The coil core is preferably made of a ferromagnetic material. The coil core is preferably situated at least partially in an interior of a conductor loop of the charging coil. The coil core is preferably made of a soft magnetic material. In particular, the coil core has a relative permeability greater than 100, preferably greater than 1,000, particularly preferably greater than 5,000. The coil core preferably has at least three core segments, particularly preferably at least four core segments.

In particular, an "interior of the charging coil" is understood to be a space which is surrounded on a plane by the conductor loop by more than 270 degrees, preferably by 360 degrees. In particular, "provided" is understood to mean specially configured and/or equipped. The term "transmitted" in this context is understood to mean, in particular, the fact that the charging coil is provided for transferring energy with the aid of a magnetic field. The charging coil is preferably provided for transmitting the energy through an electrically insulating layer. The electrically insulating layer is preferably an area of a housing at least of the hand tool device.

In particular, the phrase "movable relative to each other" is understood to mean that a position of the one core segment relative to a position of the other core segment is nondestructively movable by a distance which destroys the coil core in a one-piece design thereof. The core segments are preferably movable relative to each other by more than 0.1 mm, advantageously by more than 0.4 mm, particularly advantageously by more than 1 mm. A "core segment" is understood to be, in particular, a one-piece area of the coil core. The coil core preferably has at least three core segments, particularly preferably at least four core segments. Due to the design of the hand tool device according to the present invention, a powerful coil core may be provided which is advantageously protected against breaking, for example due to an impact after being dropped. Furthermore, individual core segments may be economically manufactured, transported and assembled.

In another embodiment, it is proposed that the coil core is made of a ceramic, in particular ferromagnetic, material, which makes it possible to advantageously achieve a particularly high efficiency during energy transmission. In particular, losses due to eddy currents may be minimized. In particular, a "ceramic" material is understood to be an an organic and polycrystalline material which was manufactured by a sintering process. Alternatively or additionally, the coil core could also be made of another material which seems suitable to those skilled in the art.

It is furthermore proposed that the core segments are separated from each other at least largely along at least one field plane extending from a field line of the charging coil, whereby an influence of the separation on a magnetic flux may be advantageously minimized. In particular, a "field plane extending from a field line of the charging coil" is understood to be a plane which is oriented and situated in such a way that it intersects the conductor loop at the interface perpendicularly to a flow direction. In particular, the field plane is oriented perpendicularly to a main extension plane of the conductor loop. A central point of the conductor loop is preferably located on the field plane, in particular in a circular conductor loop. In this context, "separated from each other" is understood to mean that the core segments are situated at a distance from each other along the field plane. The core segments preferably have two surfaces which run parallel to the field plane. These surfaces are preferably spaced a distance of less than 5 mm apart, advantageously less than 2 mm apart, particularly advantageously less than 1 mm apart. In particular, "at least largely" in this context is understood to mean that an angle of less than 30 degrees, advantageously less than 15 degrees, particularly advantageously less than 5 degrees exists between the field plane and a separating plane.

It is furthermore proposed that the hand tool device has at least one separating element which is provided for situating the core segments a distance apart from each other, thereby providing an effective coil core which is nevertheless well protected against destruction. A "separating element" is understood to be, in particular, an element which causes a force to act upon at least one of the core segments in at least one operating state, the force preventing the core segments from approaching each other. The separating element is preferably situated between the at least two coil elements. In particular, this means that the separating element is situated on a straight line which intersects at least two different, adjacent core segments. The separating element preferably has an adhesive layer, a foamed material and/or another material which seems suitable to those skilled in the art.

It is also proposed that the charging coil has a conductor loop and a conductor holding unit, which is provided for fixing the conductor loop, whereby a stable and reliable fixing of the conductor loop may be achieved. In particular, a "conductor loop" is understood to be an electrical conductor which is provided for conducting an electric current around an interior of the charging coil, in particular by more than 300 degrees. The conductor loop preferably has multiple windings in which the conductor loop conducts the electric current around the interior multiple times. The conductor loop preferably delimits the interior in a circular manner on a plane, in particular on a main extension plane of the conductor loop. Alternatively, the conductor loop may delimit the interior in a polygonal, oval, or rectangular manner or in another shape which seems suitable to those skilled in the art. The conductor holding unit is preferably designed as a molded part onto which the conductor loop is wound. Alternatively or additionally, the conductor loop could be at least partially cast into the conductor holding unit.

It is furthermore proposed that the conductor holding unit is provided for fixing the core segments, whereby a simple design and advantageous assembly are possible. The conductor holding unit preferably fixes the core segments in an integral, force-fit and/or preferably form-locked manner. The core segments and/or advantageously the conductor holding unit preferably have latching elements which couple the core segments and the conductor holding unit in at least one operating state.

In one advantageous embodiment of the present invention, it is proposed that the separating element is designed as a rib of the conductor holding unit, which makes it possible to eliminate components. In particular, a "rib" is understood to be a plank-shaped area which protrudes from a surface of the conductor fixing area. The separating element is preferably integrally molded onto a conductor fixing area of the conductor holding unit. Alternatively or additionally, the separating element could be designed as a plastic lamella.

It is furthermore provided that the hand tool device includes a fixing means which is provided for fixing the charging coil without play, whereby a structurally simple fixing and a high mechanical stability are possible. The phrase "fixing without play" is understood to mean, in particular, that the charging coil and at least one area of the fixing means are not movably connected relative to each other. A deformation of the fixing means preferably causes a deformation of the charging coil.

The fixing means is preferably designed at least partially as a single piece with a housing, in particular a hand tool battery, a charging device or a hand tool.

The present invention is furthermore directed to a charging device having a hand tool device according to the present invention. A "charging device" is understood to be, in particular, a device which is provided for transmitting electrical energy to a hand tool battery for the purpose of charging a battery cell. The charging device preferably has at least one means for controlling a charging operation.

The present invention is furthermore directed to a hand tool battery having a hand tool device according to the present invention. In particular, a "hand tool battery" is understood to be an energy store which is provided for supplying a hand tool with electrical energy. The hand tool battery preferably has at least one lithium-based battery cell. The hand tool battery preferably has at least one electronic system for protecting the battery cell.

The present invention is also directed to a hand tool having a hand tool device according to the present invention. A "hand tool" is understood to be, in particular, a workpiece-processing and/or workpiece-measuring device; advantageously, however, it may be a power drill, a combi drill and/or a percussion drill, a saw, a plane, a screwdriver, a mortiser, a grinder, an angle grinder, a gardening tool, a distance measuring device, a locating device, a multifunction tool and/or another hand tool which seems suitable to those skilled in the art. The hand tool preferably has at least one battery cell which is provided for being charged with a charging energy with the aid of the hand tool device. Alternatively, the hand tool is provided, in particular, for being supplied with an operating energy of a drive motor by a separable hand tool battery with the aid of the hand tool device.

DETAILED DESCRIPTION OF THE INVENTION

Figure 1:
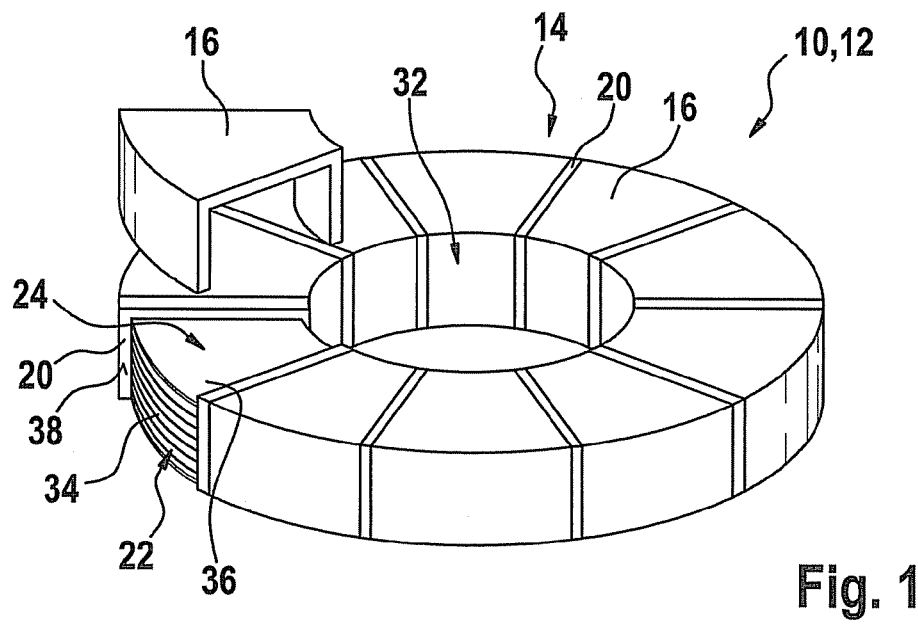
FIG. 1 shows a perspective view of a hand tool device according to the present invention.
Figure 2:
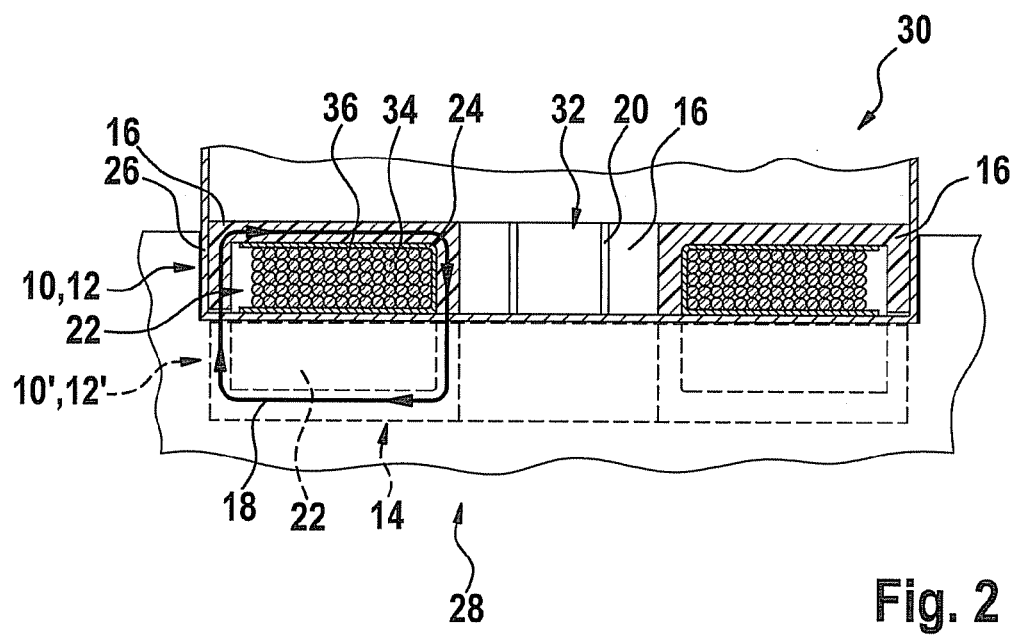
FIG. 2 shows a section of a system having a hand tool battery and a charging device, each of which has the hand tool device from FIG. 1.

FIG. 1 shows a hand tool device 10 according to the present invention, which has a charging coil 12. Charging coil 12 transmits energy of another charging coil 12' during a charging operation of a battery cell, which is not illustrated in greater detail herein. This charging coil 12' and a fixing means 26 of charging coil 12 of hand tool device 10 according to the present invention are illustrated in FIG. 2. Hand tool device 10 has a coil core 14, a conductor loop 22 and a conductor holding unit 24. Conductor loop 22 is provided for conducting a current around an interior 32 of conductor loop 22. For this purpose, conductor loop 22 has multiple wire windings 34. Conductor loop 22 surrounds the largely cylindrical interior 23.

Figure 3:
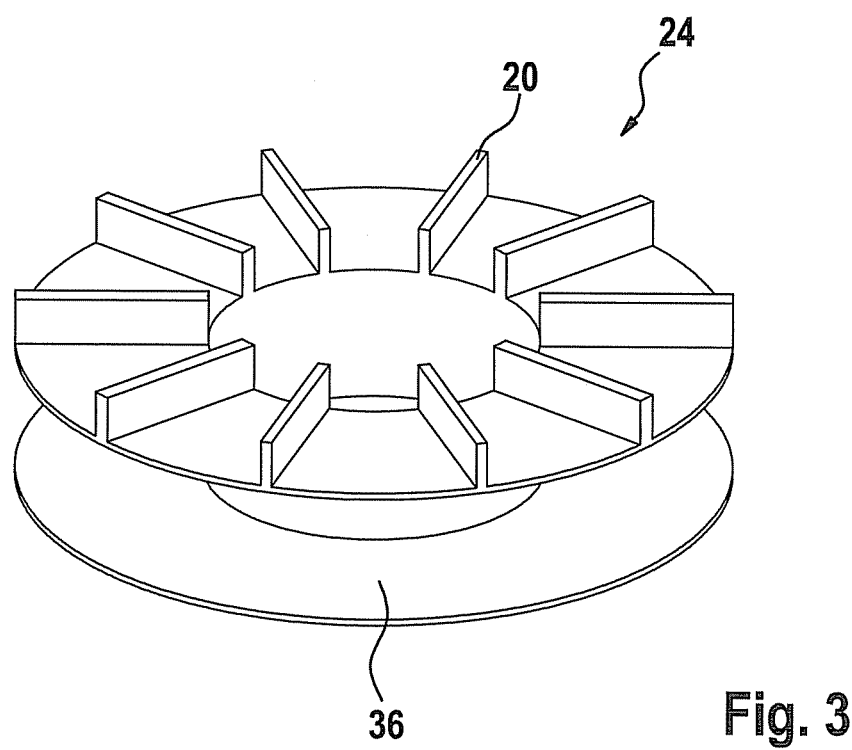
FIG. 3 shows a conductor holding unit of the hand tool device from FIG. 1.

Conductor loop 22 is fixed to, i.e., wound onto, conductor holding unit 24. Conductor holding unit 24 has an annular conductor fixing area 36. As illustrated in FIG. 3, conductor fixing area 36 has a U-shaped profile. An open side of the U-shaped profile is oriented to the outside. Alternatively, a conductor fixing area may have an L-shaped profile. An additional open side of the L-shaped profile is advantageously oriented in the direction of other charging coil 12', with which energy is exchanged, whereby a short distance to other charging coil 12' and thus an advantageously high efficiency may be achieved.

Charging coil 14 is provided with a multi-piece design and has multiple core segments 16. In this exemplary embodiment, the coil core has ten core segments 16. Core segments 16 are fixed movably relative to each other. Core segments 16 are fixed to conductor holding unit 24. For this purpose, core segments 16 have fixing means on conductor holding unit 24 which are not illustrated in greater detail. Conductor holding unit 24 fixes core segments 16 slightly movably relative to each other. Core segments 16 are made of a ceramic material, i.e., of ferrite. Conductor holding unit 24 permits movements of core segments 16 relative to each other in which a one-piece coil segment breaks.

Coil core 14 has an annular design. This means that it surrounds a paramagnetic and/or diamagnetic area on a plane. Coil core 14 is situated partially in interior 32 of conductor loop 22. Coil core 14 has a U-shaped profile. An open side of the U-shaped profile is oriented in the direction of other charging coil 12'. Conductor loop 22 and conductor holding unit 24 are situated within the U-shaped profile. Core segments 16 each form an annular segment of coil core 14. Core segments 16 are separated from each other along separating planes 38 which are oriented parallel to field planes extending from field lines 18 of charging coil 12. Separating planes 38 are oriented perpendicularly to a main extension plane of charging coil 12 and run through a central point of charging coil 12.

Conductor holding unit 24 has multiple separating elements 20 which situate core segments 16 at a distance from each other. Separating elements 20 are situated between core segments 16 along separating planes 38. Separating elements 20 are made of a material which is at least one hundred times softer than core segments 16. In this case, separating elements 20 are made of a plastic. Separating elements 20 are molded onto conductor fixing area 36 of conductor holding unit 24. Separating elements 20 are designed as ribs. Hand tool device 10 has fixing means 26 for fixing charging coil 12. Fixing means 26 is designed as part of a housing of a hand tool battery 30. Fixing means 26 fixes charging coil 12 without play.

FIG. 2 shows a schematic representation of a system which includes a partially illustrated charging device 28 and partially illustrated hand tool battery 30. Charging device 28 and hand tool battery 30 each have a hand tool device 10, 10' according to the present invention. Charging device 28 transmits energy to charging coil 12 of hand tool battery 30 during a charging operation with the aid of charging coil 12'. Hand tool battery 30 stores the transmitted energy. During an operation, hand tool battery 30 transfers the stored energy to a hand tool of the system, which is not illustrated in greater detail here, with the aid of charging coil 12, the system also including a hand tool device.

What is claimed is:

1. A hand tool battery, comprising:
    a hand tool device including:
        at least one charging coil configured to transmit energy, the charging coil having a coil core which has at least two core segments movable relative to each other; and
        at least two separating elements, each of the two separating elements being configured to position two adjacent core segments at a distance apart from each other,
    wherein the charging coil has an inner perimeter and an outer perimeter and a first top face and a second top face, and the charging coil is surrounded by the coil core such that at least one of the first top face and the second top face forms an open face not surrounded by the coil core, wherein the charging coil has a conductor loop and a conductor holding unit fixedly holding the conductor loop, wherein the conductor holding unit has a conductor fixing area configured to accommodate the charging coil, and at least two coil core fixing areas each configured to accommodate one of the core segments, wherein the coil core fixing areas are defined by the separating elements which are molded onto the conductor holding unit,
    wherein the coil core has a U-shaped profile, wherein in operation of the hand tool device an open side of the U-shaped profile is oriented towards another charging coil situated outside the hand tool device.

2. The hand tool battery as recited in claim 1, wherein the coil core is made of a ceramic material.

3. The hand tool battery as recited in claim 1, wherein the core segments are separated from each other by the at least two separating elements at least along at least one field plane extending from a field line of the charging coil.

4. The hand tool battery as recited in claim 1, wherein the conductor holding unit fixedly positions the core segments.

5. The hand tool battery as recited in claim 1, wherein the separating element is configured as a rib of the conductor holding unit.

6. The hand tool battery as recited in claim 1, further comprising:
    a fixing unit which fixedly positions the charging coil.

7. The hand tool battery as recited in claim 1, wherein the conductor fixing area is an annular conductor fixing area.

8. The hand tool battery as recited in claim 7, wherein the conductor fixing area has a U-shaped profile, the U-shaped profile having an open side which is oriented to the outside.

9. The hand tool battery as recited in claim 7, wherein the conductor fixing area has an L-shaped profile, the L-shaped profile having a first open side which is oriented to the outside and a second open side which is oriented away from the at least two core segments.

10. The hand tool battery as recited in claim 1, wherein at least one of the at least two separating elements is configured as a rib.

11. The hand tool battery as recited in claim 10, wherein the coil core is made of a ceramic material.

12. The hand tool battery as recited in claim 10, wherein the core segments are separated from each other at least along at least one field plane extending from a field line of the charging coil.

13. The hand tool battery as recited in claim 1, wherein the conductor holding unit fixedly positions the core segments.

14. The hand tool battery as recited in claim 10, wherein the separating element is configured as a rib of the conductor holding unit.

15. The hand tool battery as recited in claim 12, further comprising:
    a fixing unit which fixedly positions the charging coil.

16. A hand tool battery, comprising:
    a hand tool device including:
        at least one charging coil configured to transmit energy, the charging coil having a coil core which has at least two core segments movable relative to each other, wherein the charging coil has a conductor loop and a conductor holding unit fixedly holding the conductor loop; and
        at least one separating element which positions the core segments at a distance apart from each other, wherein the at least one separating element is molded onto the conductor holding unit and each of the at least one separating element:
            extends in a direction from an outer perimeter of the conductor holding unit towards a center of the conductor holding unit; and
            is molded, at a bottom of the respective separating element all along the extension of the respective separating element, onto the conductor holding unit,
        wherein the coil core has a U-shaped profile, wherein in operation of the hand tool device an open side of the U-shaped profile is oriented towards another charging coil situated outside the hand tool device.

17. The hand tool battery as recited in claim 16, wherein the coil core is made of a ceramic material.

18. The hand tool battery as recited in claim 16, wherein the core segments are separated from each other at least along at least one field plane extending from a field line of the charging coil.

19. The hand tool battery as recited in claim 16, wherein the conductor holding unit fixedly positions the core segments.

20. The hand tool battery as recited in claim 16, wherein the separating element is configured as a rib of the conductor holding unit.

21. The hand tool battery as recited in claim 16, further comprising:
    a fixing unit which fixedly positions the charging coil.

22. A handheld tool including the hand tool device as recited in claim 16.

23. The hand tool battery as recited in claim 16, wherein the at least one separating element is configured as a rib.

24. A charging device, comprising:
    a hand tool device including:
        at least one charging coil configured to transmit energy, the charging coil having a coil core which has at least two core segments movable relative to each other;
        and at least two separating elements, each of the two separating elements being configured to position two adjacent core segments at a distance apart from each other,
    wherein the charging coil has an inner perimeter and an outer perimeter and a first top face and a second top face, and the charging coil is surrounded by the coil core such that at least one of the first top face and the second top face forms an open face not surrounded by the coil core, wherein the charging coil has a conductor loop and a conductor holding unit fixedly holding the conductor loop, wherein the conductor holding unit has a conductor fixing area configured to accommodate the charging coil, and at least two coil core fixing areas each configured to accommodate one of the core segments, wherein the coil core fixing areas are defined by the separating elements which are molded onto the conductor holding unit, wherein the coil core has a U-shaped profile, wherein in operation of the hand tool device an open side of the U-shaped profile is oriented towards another charging coil situated outside the hand tool device.

25. A charging device, comprising:
a hand tool device including:
  at least one charging coil configured to transmit energy, the charging coil having a coil core which has at least two core segments movable relative to each other, wherein the charging coil has a conductor loop and a conductor holding unit fixedly holding the conductor loop; and
  at least one separating element which positions the core segments at a distance apart from each other, wherein the at least one separating element is molded onto the conductor holding unit and each of the at least one separating element:
    extends in a direction from an outer perimeter of the conductor holding unit towards a center of the conductor holding unit; and
    is molded, at a bottom of the respective separating element all along the extension of the respective separating element, onto the conductor holding unit,
  wherein the coil core has a U-shaped profile, wherein in operation of the hand tool device an open side of the U-shaped profile is oriented towards another charging coil situated outside the hand tool device.

26. The hand tool battery as recited in claim 1, wherein the conductor holding unit is made of a plastic material.

27. The hand tool battery as recited in claim 1, wherein the conductor loop is wound into the conductor fixing area of the conductor holding unit.

28. The hand tool battery as recited in claim 1, wherein the conductor loop is at least partially cast into the conductor fixing area of the conductor holding unit.

29. The hand tool battery as recited in claim 1, wherein the conductor holding unit is an annular conductor holding unit.

30. The hand tool battery as recited in claim 1, wherein the coil core is an annular coil core.

31. The hand tool battery as recited in claim 1, wherein the core segments each form an annular segment of the coil core.

32. The hand tool battery as recited in claim 1, wherein the coil core is situated partially in an interior of the conductor loop.

33. The hand tool battery as recited in claim 16, wherein the conductor holding unit is made of a plastic material.

34. The hand tool battery as recited in claim 16, wherein the conductor loop is wound into the conductor fixing area of the conductor holding unit.

35. The hand tool battery as recited in claim 16, wherein the conductor loop is at least partially cast into the conductor fixing area of the conductor holding unit.

36. The hand tool battery as recited in claim 16, wherein the conductor holding unit is an annular conductor holding unit.

37. The hand tool battery as recited in claim 16, wherein the coil core is an annular coil core.

38. The hand tool battery as recited in claim 16, wherein the core segments each form an annular segment of the coil core.

39. The hand tool battery as recited in claim 16, wherein the coil core is situated partially in an interior of the conductor loop.

* * * * *